(12) United States Patent
Long

(10) Patent No.: US 6,674,199 B2
(45) Date of Patent: Jan. 6, 2004

(54) ELECTRIC MOTOR HOUSING

(75) Inventor: Norman Richard Long, Tipp City, OH (US)

(73) Assignee: A. O. Smith Corporation, Milwaukee, WI (US)

( * ) Notice: Subject to any disclaimer, the term of this patent is extended or adjusted under 35 U.S.C. 154(b) by 0 days.

(21) Appl. No.: 10/122,565

(22) Filed: Apr. 15, 2002

(65) Prior Publication Data

US 2003/0193251 A1 Oct. 16, 2003

(51) Int. Cl.[7] ............................................. H02K 5/00
(52) U.S. Cl. .............................. 310/89; 310/89; 310/88; 310/88 A
(58) Field of Search ................................ 310/89, 88

(56) References Cited

U.S. PATENT DOCUMENTS

| | | | |
|---|---|---|---|
| 3,873,758 A | | 3/1975 | VanGessel et al. |
| 4,926,081 A | * | 5/1990 | DiFliora et al. ............ 310/89 |
| 4,937,482 A | * | 6/1990 | Dohogne .................... 310/89 |
| 5,162,612 A | | 11/1992 | Naka et al. |
| 5,430,931 A | * | 7/1995 | Fisher ...................... 29/596 |
| 6,005,314 A | * | 12/1999 | Fisher ....................... 310/68 |
| 6,040,646 A | * | 3/2000 | Peters ....................... 310/71 |
| 6,226,174 B1 | | 5/2001 | Pratt |

OTHER PUBLICATIONS

A.O. Smith Corporation electric motor with prior art cover plate and prior art access aperture that includes a rectangular notch (see attached statement of relevance).

* cited by examiner

Primary Examiner—Nestor Ramirez
Assistant Examiner—Iraj A. Mohandesi
(74) Attorney, Agent, or Firm—Michael Best & Friedrich LLP

(57) ABSTRACT

An electric motor that can be set up for operation in one of two modes including a first mode that utilizes a power cord to removably couple the electric motor to a power source, and a second mode that utilizes a line lead to permanently couple the electric motor to a power source. The electric motor includes a housing have an aperture, and a cover plate. The cover plate is attachable to the housing in a first orientation corresponding to the first mode in which the cover plate substantially covers the aperture and leaves an opening for the power cord, and a second orientation corresponding to the second mode in which the cover plate substantially covers the aperture and does not leave an opening.

19 Claims, 2 Drawing Sheets

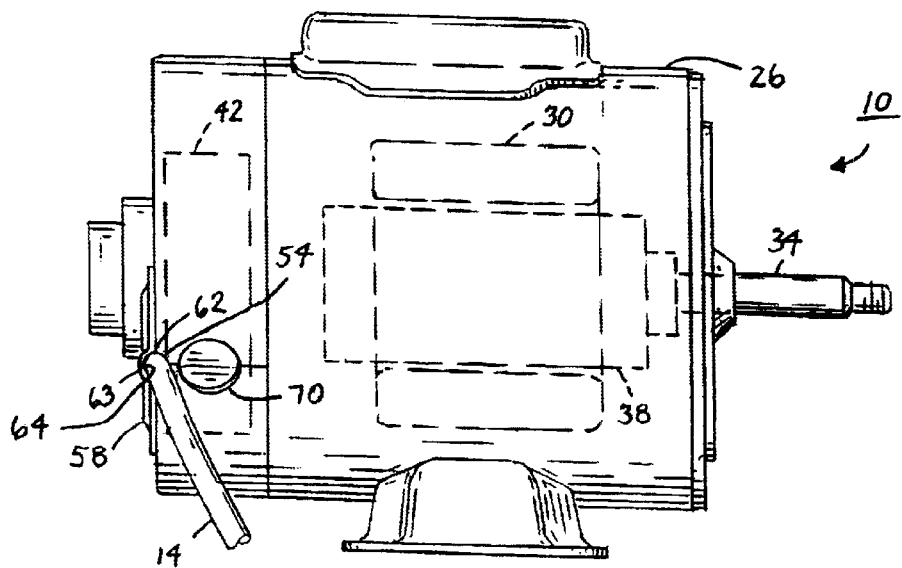
FIG. 1
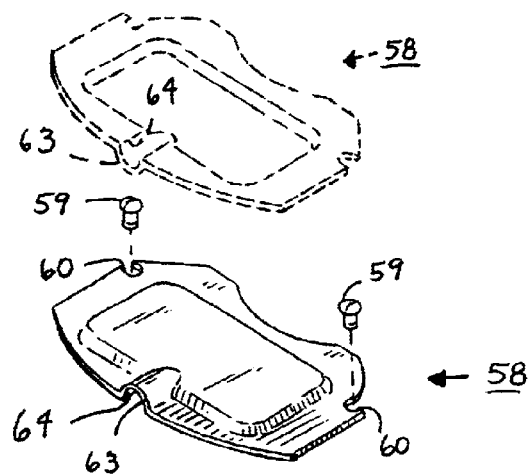
FIG. 2
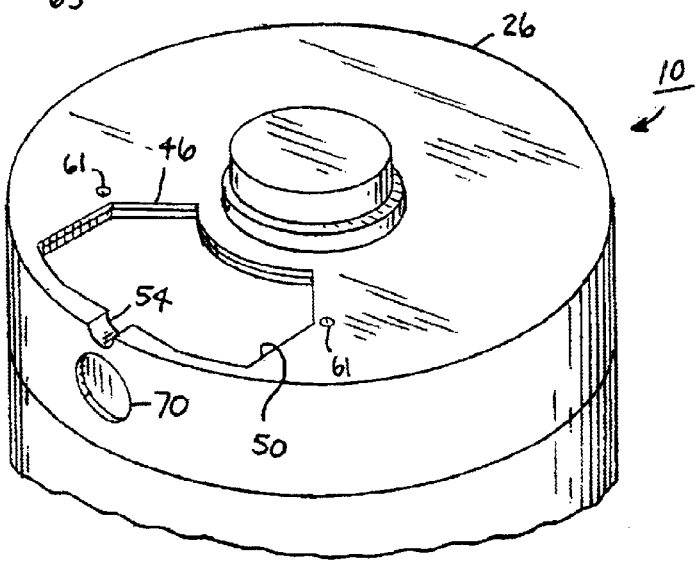

ELECTRIC MOTOR HOUSING

BACKGROUND OF THE INVENTION

The present invention relates to electric motors, and more particularly to electric motor housings.

An electric motor commonly includes a housing which encloses a shaft, a rotor, a stator, and electrical components utilized to operate the motor. For motor operation, the electrical components are electrically coupled to an electrical conduit. The housing commonly includes an access aperture which provides access to the electrical components for such purposes. A cover plate closes the access aperture when the motor is in use. The cover plate is a flat metal plate.

The electrical conduit may include either (a) a power cord that removably couples the motor to a power source, or (b) a line lead that permanently couples the motor to a power source. The electrical conduit generally travels through an aperture or opening formed in the housing. The housing may include both a power cord aperture for use with a power cord, and a line lead aperture for use with a line lead. It is known to have a power cord pass through the above-mentioned access aperture. In this case, the access aperture includes a rectangular notch or cut-out which defines an opening with a flat metal plate cover plate when the cover plate closes the access aperture. The power cord passes through this opening. A grommet can be placed in the notch, around the cord, for sealing.

When a housing includes two apertures, it is desirable to seal the unused aperture so contaminants (e.g., water, dirt, debris, etc.) do not enter the housing and interfere with motor operation. A properly sized plug is often inserted into the unused aperture to provide such a seal. Thus, when the motor is used without a cord passing through the opening defined in the access aperture, a plug must be placed in the notch to seal the housing. A problem with this approach is that the plug may be removed and/or fall out (e.g., the plug may fall out when a portion of the housing is removed for maintenance purposes). When the plug is not reinserted as previously installed, the motor is susceptible to contaminants.

SUMMARY OF THE INVENTION

Accordingly, the invention provides a motor that substantially alleviates the above-described and other problems with existing housings. The motor includes a cover plate that covers the access aperture and that is attachable to the housing in a first orientation that leaves an opening for a power cord, and in a second orientation that seals the aperture from contaminants without the use of a plug.

In the preferred embodiment of the invention, the cover plate has a semi-cylindrical protrusion forming a complementary recess, and the motor housing has therein a semi-cylindrical recess adjacent the access aperture. In the first orientation, the coverplate is mounted on the housing such that the cover plate recess faces the housing recess, forming a cylindrical opening through which the power cord passes with a snug fit. In the second orientation, the cover plate is mounted on the housing upside-down relative to the first orientation, so that the cover plate recess faces away from the housing recess, and the cover plate protrusion fits snugly in the housing recess, so that no opening is formed. The housing preferably also includes a second, circular aperture through which a line lead can pass. This aperture is closed with a plug when not in use.

As is apparent from the above, it is an advantage of the invention to provide a new and improved electric motor housing. Other features and advantages of the invention will become apparent by consideration of the detailed description and accompanying drawings.

BRIEF DESCRIPTION OF THE DRAWINGS

FIG. 1 illustrates an electric motor including a housing according to the invention.

FIG. 2 illustrates an explode view of a portion of the housing illustrated in FIG. 1.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 3:
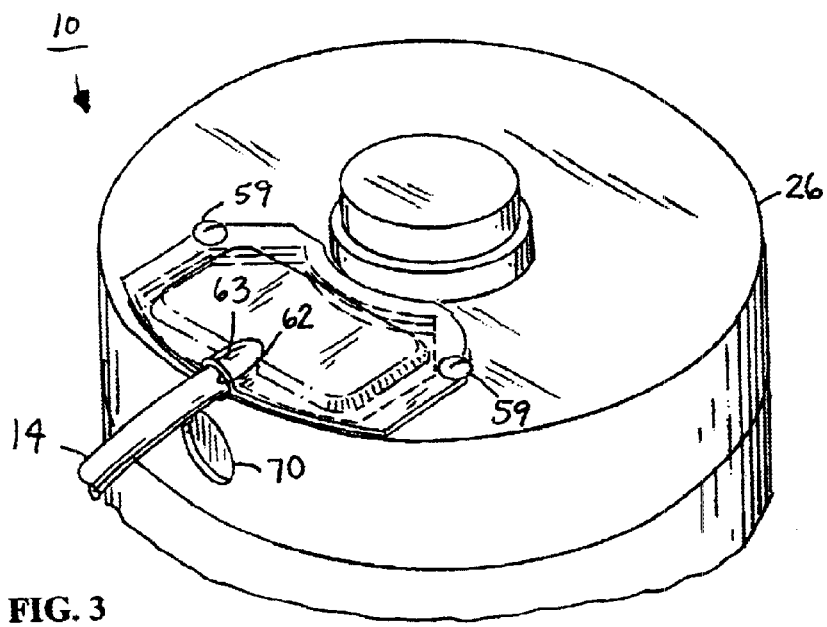
FIG. 3 illustrates a first orientation of a cover plate of the housing illustrated in FIG. 1
Figure 4:
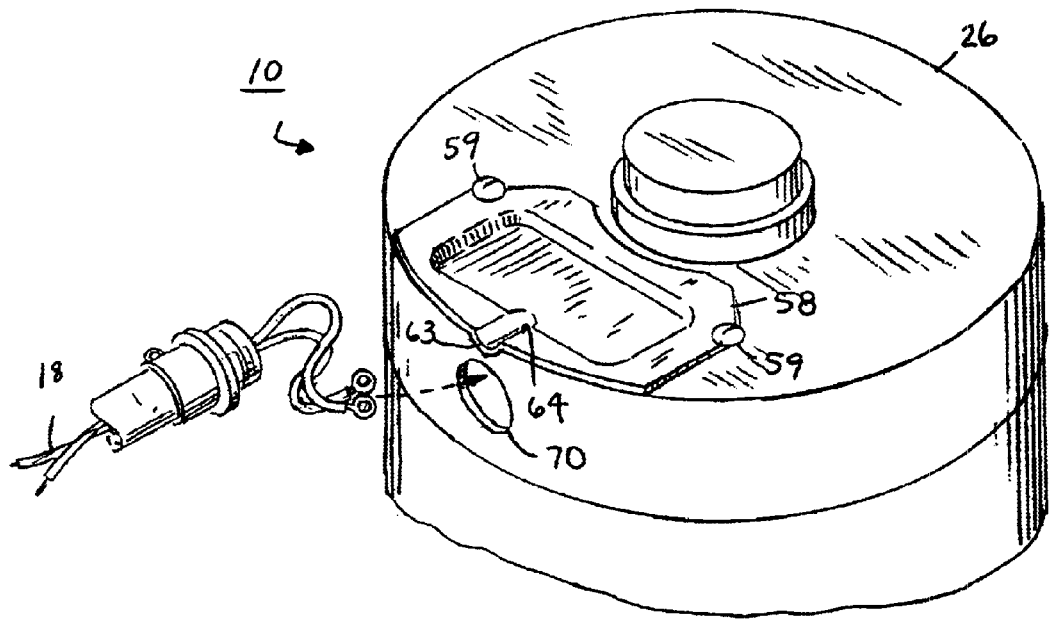
FIG. 4 illustrates a second orientation of a cover plate of the housing illustrated in FIG. 1.

FIGS. 1–4 illustrate an electric motor 10 that includes a housing 26, a stator 30 fixed relative to the housing 26, a shaft 34 rotatable relative to the housing 26, a rotor 38 connected to the shaft 34 for rotation therewith relative to the stator 30, and electrical components 42 inside the housing 26. As shown in FIG. 2, the housing 26 defines an access aperture 46 through which the components 42 are accessible. It should be understood that the present invention is capable of use on the other devices and the motor 10 is merely shown and described as an example of one such device.

The motor 10 can be set up for operation in one of two modes. The first mode (see FIGS. 1 and 3) utilizes a power cord 14 to removably couple the motor 10 to a power source (not shown), and the second mode (see FIG. 4) utilizes a line lead 18 to permanently couple the motor 10 to a power source (not shown). In other constructions, the motor 10 may include other modes of operation.

In the first mode, the power cord 14 passes through the access aperture 46. To this end, the aperture 46 includes a main portion 50 and a recess portion 54 adjacent to the main portion 50. The recess portion 54 includes a half-round or semi-cylindrical shape and is in a plane which is substantially normal to the plane in which the main portion 50 resides. More particularly, the main portion 50 is in plane substantially perpendicular to the rotor shaft 34, and the recess 54 is in plane substantially parallel to the shaft 34.

The motor 10 includes a cover plate 58 that is attachable to the housing 26 to cover the aperture 46 in first and second orientations respectively corresponding to the first and second modes of operation. The cover plate 58 is attached to the housing 26 in both orientations using fasteners 59 that are inserted through cutouts 60 in the cover plate 58 and into apertures 61 in the housing 26. Preferably, the fasteners 59 are threaded fasteners (e.g., screws) that are threaded into the apertures 61. Alternatively, the cover plate 58 may be attached to the housing 26 using any type of fastener (e.g., adhesives, other types of threaded fasteners, non-threaded fasteners, etc.).

In the first orientation (see FIGS. 1 and 3), the cover plate 58 is attached to the housing 26 so the cover plate 58 completely covers the aperture 46 except for an opening 62. The opening 62 is preferably cylindrical and has substantially the same size as the power cord 14. The opening is defined by the recess portion 54 and by a protrusion 63 on the cover plate 58, the protrusion 63 being located over the recess 54. In the illustrated construction, the protrusion 63 includes a half-round or semi-cylindrical shape corresponding to the half-round shape of the recess portion 54. The protrusion 63 forms a semi-cylindrical recess 64 that faces the recess 54 when the cover plate 58 is in the first orientation, the recesses 54 and 64 forming the opening 62. In alternative constructions (not shown), the opening 62 may be larger than the power cord 14. In such constructions, a sealing structure such as a grommet or a foam plug can be used to provide a seal between the power cord 14, the housing 26 and the plate 58.

In the second orientation (see FIG. 4), the cover plate 58 is attached to the housing 26 so the cover plate 58 covers the entire aperture 46 (i.e., the main portion 50 and the recess portion 54) and does not leave an opening, such as the opening 62, for a power cord. The cover plate 58 is attached to the housing 26 in the second oriented by inverting the cover plate 58 with respect to the first orientation so the protrusion 63 is inserted into the recess portion 54. In the illustrated construction, the corresponding half-round shape of the protrusion 63 forms a seal against the half-round shape of the recess portion 54. Preferably, the aperture 46 is sealed from contaminants when the cover plate 58 is attached in each of the two modes. When the motor 10 is operated in the second mode, the line lead 18 passes through a circular opening 70 in the housing 26. The opening 70 is plugged, as is known in the art, when the motor is operated in the first mode.

It should be understood that the illustrated construction of the motor 10 is merely shown and described as an example of one such motor. In alternative constructions, the motor may include an aperture in the housing and a cover plate that vary in shape and/or size with respect to the aperture 46 and the cover plate 58. The alternative aperture may include a main portion and any number of recess portions (e.g., zero, one, two, three, etc.). The alternative aperture may be located in a single plane or in any number of planes. Similarly, the alternative cover plate may include any number of protrusions, cutouts, recesses, etc.

Thus, the invention provides, among other things, a new and improved electric motor housing. Various features and advantages of the invention are set forth in the following claims.

What is claimed is:

1. An electric motor that can be set up for operation in one of two modes including a first mode that utilizes a first electrical conduit to couple the electric motor to a power source, and a second mode that utilizes a second electrical conduit to couple the electric motor to a power source, the electric motor comprising:
   a housing that defines an aperture;
   a stator fixed relative to the housing;
   a shaft rotatable relative to the housing;
   a rotor connected to the shaft for rotation therewith relative to the stator;
   electrical components inside the housing that are accessible through the aperture, the electrical components connected to the first electrical conduit in the first mode and connected to the second electrical conduit in the second mode; and
   a cover plate that is attachable to the housing in
      a first orientation corresponding the first mode in which the cover plate substantially covers the aperture and leaves an opening in the aperture for the first electrical conduit to pass through, and
      a second orientation corresponding to the second mode in which the cover plate substantially covers the entire aperture without leaving an opening in the aperture for an electrical conduit to pass through.

2. An electric motor as claimed in claim 1, wherein the housing includes an end frame, wherein the aperture is defined in the end frame.

3. An electric motor as claimed in claim 1, wherein the first electrical conduit includes a power cord that removably couples the electric motor to the power source.

4. An electric motor as claimed in claim 1, wherein the second electrical conduit includes a line lead that permanently couples the motor to the power source.

5. An electric motor as claimed in claim 1, wherein the aperture includes a main portion and a recess portion adjacent to the main portion.

6. An electric motor as claimed in claim 5, wherein the main portion is located in a first plane and the recess portion is located in a second plate substantialy normal to the first plane.

7. An electric motor as claimed in claim 5, wherein the recess portion includes a half-round shape, wherein the cover plate includes a protrusion having a half-round shape which corresponds to the half-round shape of the recess portion, and wherein the opening includes a round shape formed by the recess portion and the protrusion.

8. An electric motor as claimed in claim 1, wherein the opening is sized substantially similar to the cross-section of the first electrical conduit.

9. A method of assembling an electric motor including a housing having an aperture that provides access to electrical components inside the housing, a stator fixed relative to the housing, a shaft rotatable relative to the housing, and a rotor supported by the shaft for rotation therewith relative to the stator, the method comprising:
   providing a cover plate; and
   setting the motor up in one of two modes,
      wherein, if the motor is set up in the first mode,
         a first electrical conduit is connected to the electrical components, and
         the cover plate is attached to the housing in a first orientation so that the cover plate substantially covers the aperture but leaves an opening in the aperture through which the first electrical conduit passes,
      and wherein, if the motor is set up in the second mode,
         a second electrical conduit is connected to the electrical components, and
         the cover plate is attached to the housing in a second orientation so that the cover plate substantially covers the aperture and does not leave an opening in the aperture for an electrical conduit to pass through.

10. A method as claimed in claim 9, wherein the first electrical conduit includes a power cord that removably couples the electrical motor to a power source.

11. A method as claimed in claim 9, wherein the second electrical conduit includes a line lead that permanently couples the electric motor to a power source.

12. A method as claimed in claim 9, wherein the aperture includes a main portion and a recess portion adjacent to the main portion.

13. A method as claimed in claim 12, wherein the main portion is located in a first plane and the recess portion is located in a second plane substantially normal to the first plane.

14. A method as claimed in claim 12, wherein the recess portion includes a half-round shape, wherein the cover plate includes a protrusion having a half-round shape which corresponds to the half-round shape of the recess portion, and wherein the opening includes a round shape formed by the recess portion and the protrusion.

15. A method as claimed in claim 9, wherein the opening is sized substantially similar to the cross-section of the first electrical conduit.

16. An electric motor that can be set up for operation in one of two modes including a first mode that utilizes a power cord to removably couple the electric motor to a power source, and a second mode that utilizes a line lead to permanently couple the electric motor to a power source, the electric motor comprising:

- a housing that defines an aperture, the aperture having a main portion and a recess portion adjacent to the main portion;
- a stator fixed relative to the housing;
- a shaft rotatable relative to the housing;
- a rotor connected to the shaft for rotation therewith relative to the stator;
- electrical components inside the housing that are accessible through the aperture, the electrical components connected to the power cord in the first mode and connected to the line lead in the second mode; and
- a cover plate that is attachable to the housing in
   - a first orientation corresponding to the first mode in which the cover plate covers the main portion of the aperture and the cover plate and the recess portion of the aperture at least partially define an opening in the aperture through which the power cord passes, and
   - a second orientation corresponding to the second mode in which the cover plate substantially covers the main portion and the recess portion and does not define an opening in the aperture through which the power cord or the line lead passes.

17. An electric motor as claimed in claim 16, wherein the housing includes an end frame, wherein the aperture is defined in the end frame.

18. An electric motor as claimed in claim 16, wherein the main portion is located in a first plane and the recess portion is located in a second plane substantially normal to the first plane.

19. An electric motor as claimed in claim 16, wherein the opening is sized substantially similar to the cross-section of the first power cord.

* * * * *

UNITED STATES PATENT AND TRADEMARK OFFICE
CERTIFICATE OF CORRECTION

PATENT NO.    : 6,674,199 B2
DATED         : January 6, 2004
INVENTOR(S)   : Richard Long It is certified that error appears in the above-identified patent and that said Letters Patent is hereby corrected as shown below:

Column 4,
Line 5, should read:
-- a first orientation corresponding to the first mode in which --
Line 26, should read:
-- is located in a second plane substantially normal to the first --

Signed and Sealed this

Seventh Day of December, 2004

JON W. DUDAS
*Director of the United States Patent and Trademark Office*